United States Patent
Brown et al.

(10) Patent No.: US 11,667,164 B2
(45) Date of Patent: Jun. 6, 2023

(54) TRAILER COUPLER LOCK

(71) Applicants: Grant P. Brown, Red Deer (CA);
Chad R. Coleman, Red Deer (CA)

(72) Inventors: Grant P. Brown, Red Deer (CA);
Chad R. Coleman, Red Deer (CA)

(73) Assignee: Grant P. Brown, Calgary (CA)

( * ) Notice: Subject to any disclaimer, the term of this patent is extended or adjusted under 35 U.S.C. 154(b) by 79 days.

(21) Appl. No.: 17/476,641

(22) Filed: Sep. 16, 2021

(65) Prior Publication Data
US 2022/0088982 A1 Mar. 24, 2022

(30) Foreign Application Priority Data

Sep. 23, 2020 (CA) .................................. CA 3093944

(51) Int. Cl.
*B60D 1/60* (2006.01)
(52) U.S. Cl.
CPC ....................................... *B60D 1/60* (2013.01)
(58) Field of Classification Search
CPC ........................................................ B60D 1/60
See application file for complete search history.

(56) References Cited

U.S. PATENT DOCUMENTS

| | | | | |
|---|---|---|---|---|
| 3,526,110 A | * | 9/1970 | Foote | B60D 1/60 280/507 |
| 3,780,546 A | * | 12/1973 | Longenecker | B60D 1/60 70/171 |
| 3,977,221 A | * | 8/1976 | Foote | E05B 73/00 280/507 |
| 4,291,557 A | * | 9/1981 | Bulle | B60D 1/60 280/507 |
| 5,752,398 A | * | 5/1998 | Villaion, Jr. | B60D 1/60 280/507 |

(Continued)

FOREIGN PATENT DOCUMENTS

DE 0318653 A1 * 6/1989

OTHER PUBLICATIONS

Proven Industries, screenshot from YouTube video entitled, "Block Hero Lock", https://www.youtube.com/watch?v=NMu_GnNnnBE, May 19, 2015.

(Continued)

*Primary Examiner* — Kevin Hurley
(74) *Attorney, Agent, or Firm* — ATMAC Patent Services Ltd.; Andrew T. MacMillan (57) ABSTRACT

A trailer coupler lock includes a coupler lock body and pin body assembly. The lock body retains the pin body assembly and slides horizontally onto a trailer coupler. When the lock body is in position under the trailer coupler, the pin body assembly is slid upward through the lock body and a protruding pin section of the pin body passes via a top hole in the pin body to enter into the coupler ball socket. While the pin body is in this position, a key is utilized to slide a shackle on the pin body assembly through a hasp on the lock body thereby blocking retraction of the pin body and locking the whole assembly together onto the trailer coupler. In this locked position, the protruding pin section of the pin body secures the coupler lock body to the trailer coupler and prevents an unwanted union with a trailer hitch.

20 Claims, 7 Drawing Sheets

(56) References Cited

U.S. PATENT DOCUMENTS

| | | | |
|---|---|---|---|
| 6,412,314 B1* | 7/2002 | Jenks | B60D 1/60 |
| | | | 280/507 |
| 7,543,838 B2* | 6/2009 | Jacques | B60D 1/60 |
| | | | 280/506 |
| 8,757,654 B2* | 6/2014 | Lachance | B60D 1/60 |
| | | | 280/507 |
| 2022/0402317 A1* | 12/2022 | Lee, Jr | B60D 1/60 |

OTHER PUBLICATIONS

Tow Ready, screenshot from Amazon item listing entitled, "Tow Ready 63228 Coupler Lock Gorilla Guard, Silver, 2", https://www.amazon.ca/Tow-Ready-63228-Coupler-Gorilla/dp/B004KJ6KFG/ref=asc_df_B004KJ6KFG/?tag=googleshopc0c-20&linkCode=df0&hvadid=292900526366&hvpos=&hvnetw=g&hvrand=13623781017900959155&hvpone=&hvptwo=&hvqmt=&hvdev=c&hvdvcmdl=&hvlocint=&hvlocphy=1001801&hvtargid=pla-383227593330&psc=1, Downloaded Sep. 3, 2021.

* cited by examiner

TRAILER COUPLER LOCK

CROSS-REFERENCE TO RELATED APPLICATIONS

This application claims the benefit of priority of Canadian Patent Application No. 3,093,944 filed Sep. 23, 2020, which is incorporated herein by reference.

BACKGROUND OF THE INVENTION

(1) Field of the Invention

The invention pertains generally to trailer coupler locks. More specifically, the invention relates to a trailer lock for "ball" type trailer couplers that is more difficult for thieves to breach without extensive time & tools.

(2) Description of the Related Art

Trailer theft continues to rise as thieves become more emboldened and professional. Both residential and industrial areas are prone to trailer theft in the minimal time it takes to back up to a trailer, hook up and drive away.

Most currently available locks can be breached quite easily with a hammer, pry bar, or battery powered grinder. Some known designs feature an external retainer bar which holds the lock body in position; however, these designs can be cut with bolt cutters or battery powered tools. Another design of trailer lock utilizes a notched rail and catch, which can be broken with an impact, or the whole lock body can be forced off the trailer coupler with a pry bar. Yet other existing designs feature a body vulnerable to hammer and pry bar.

BRIEF SUMMARY OF THE INVENTION

It is an object of some embodiments of the invention to provide a locking mechanism and associated trailer coupler lock suitable for usage with "ball" type trailer couplers.

It is an object of some embodiments of the invention to increase the difficulty of trailer theft by providing a hidden shackle and hasp style trailer coupler lock to secure parked trailers.

According to an exemplary embodiment of the invention there is disclosed a trailer coupler lock that includes a pin body assembly that is slidable to move in a lock position upward into a coupler ball socket, which thereby secures the coupler lock body.

According to an exemplary embodiment of the invention there is disclosed a keyed trailer coupler lock system for quick installation when trailer security is required. An advantage of some embodiments is that the trailer coupler lock system can secure parked ball-type trailers including travel, boat, recreational, cargo and industrial trailers.

According to an exemplary embodiment of the invention there is disclosed a trailer coupler lock that includes a shackle head that is rotatable such that the shackle head engages with shackle retaining roll pins in a locked position and disengages with the shackle retaining roll pins in a released position.

According to an exemplary embodiment of the invention there is disclosed a trailer coupler lock that includes a shaped or profile pin formed by a non-circular protruding pin portion that extends upwards for insertion into a trailer coupler ball socket.

According to an exemplary embodiment of the invention there is disclosed a trailer coupler lock formed by two main components including a lock body and a pin body assembly. Once the lock is assembled, these two main components of the lock work as one complete unit. Beneficially in some embodiments, the two main components remain together once unlocked from the coupler.

According to an exemplary embodiment of the invention there is disclosed a trailer coupler lock including a lock body having a trailer coupler flange retainer around a top surface, a top hole through the top surface, and a pin body guard extending around a bottom surface. The trailer lock coupler further includes a hasp on the lock body that extends downward and is surrounded at least in part by the pin body guard, a pin body having a protruding portion extending upwards, a lock cylinder bore, a hasp pocket, and a key cylinder installed in the lock cylinder bore of the pin body, and a shackle attached to the key cylinder. The shackle is moveable by the key cylinder within the pin body between a first position where the shackle passes into the hasp pocket and a second position where the shackle does not pass into the hasp pocket. The hasp of the lock body enters the hasp pocket of the pin body when the lock body and the pin body are moved relative to one another by a user such that a protruding pin portion of the pin body passes through the top hole of the lock body.

According to an exemplary embodiment of the invention there is disclosed a trailer coupler lock including a one or more catches being tabs extending from the lock body surface into the top hole and one or more catch grooves being channels running vertically on the protruding pin portion through which the catches slide while the protruding pin portion is moved through the top hole. A retainer plate is mounted on the top surface of the protruding pin portion. The retainer plate covers the catch grooves thereby blocking the catches of the lock body from passing by the retainer plate.

According to an exemplary embodiment of the invention there is disclosed a trailer coupler lock including a plurality of shackle retaining roll pins. The shackle retaining roll pins are installed on opposite sides of the lock cylinder bore and are separated from one another by a predetermined distance therebetween. The shackle is rotatable and a head of the shackle has a non-symmetrical shape such that such the head is wider than the predetermined distance preventing the head from passing through the shackle retaining roll pins when the shackle is rotated into a locked position, and narrower than the predetermined distance thereby allowing the head to pass through the shackle retaining roll pins when the shackle is rotated into a released position.

These and other advantages and embodiments of the present invention will no doubt become apparent to those of ordinary skill in the art after reading the following detailed description of preferred embodiments illustrated in the various figures and drawings.

BRIEF DESCRIPTION OF THE DRAWINGS

The invention will be described in greater detail with reference to the accompanying drawings which represent preferred embodiments thereof.

DETAILED DESCRIPTION

Figures 3A, 3D:
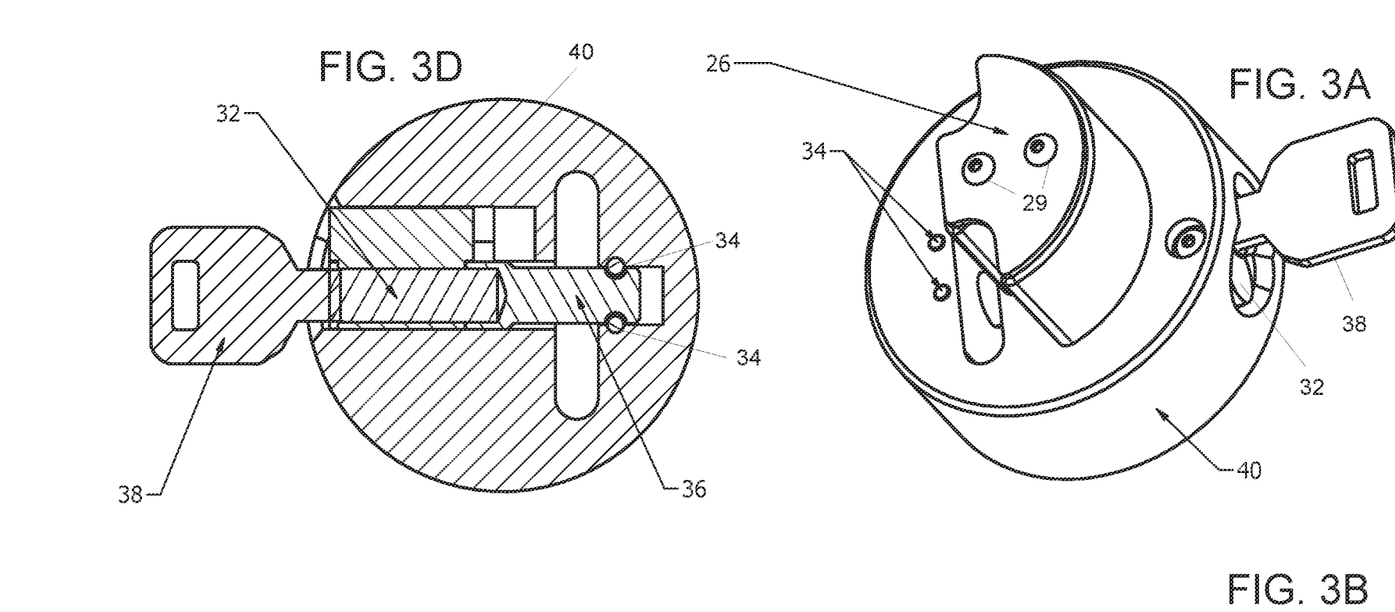
FIG. 3A illustrates a top and side perspective view of a pin body assembly according to an exemplary embodiment.
FIG. 3D illustrates a cross sectional view of the pin body assembly of FIG. 3A taken across the line A-A shown in FIG. 3C.
Figure 3B:
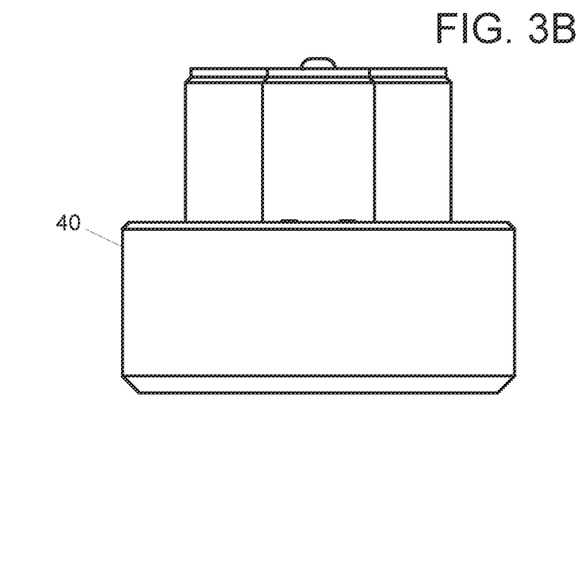
FIG. 3B illustrates a rear elevational view of the pin body assembly of FIG. 3A.
Figure 3C:
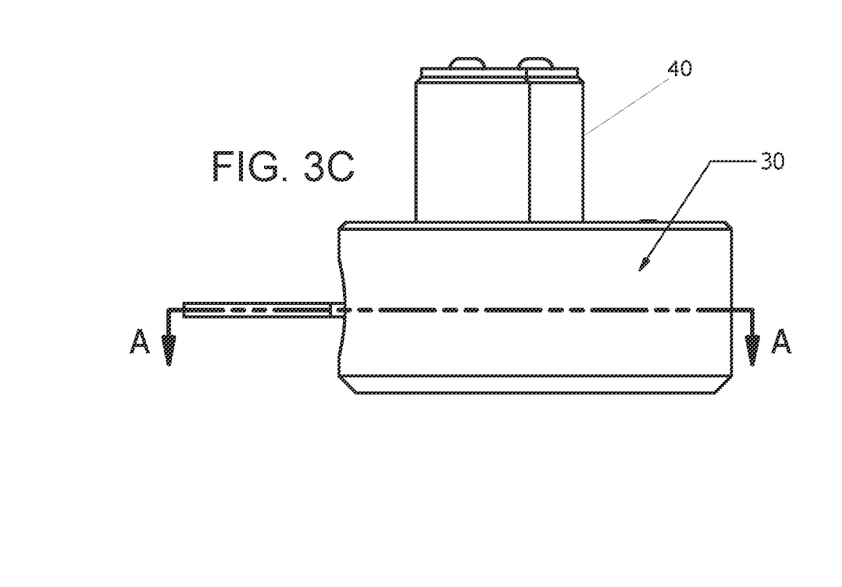
FIG. 3C illustrates a side elevational view of the pin body assembly of FIG. 3A.
Figure 4A:
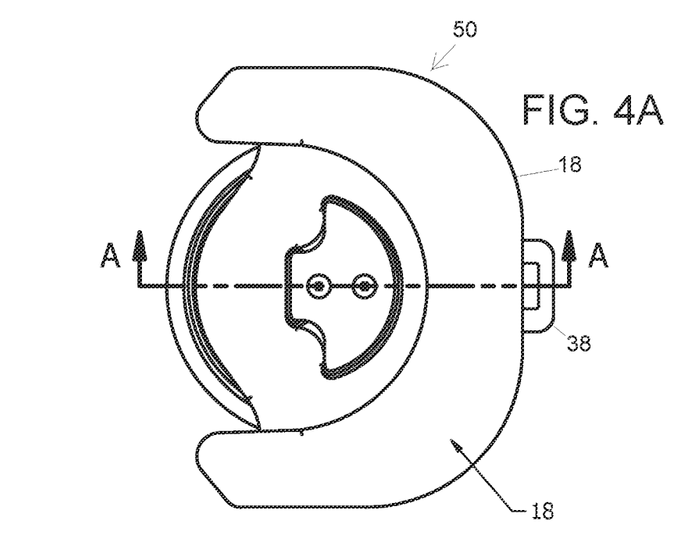
FIG. 4A illustrates a top plan view of a coupler lock assembly with the shackle and lock cylinder in a locked position according to an exemplary embodiment.
Figure 4B:
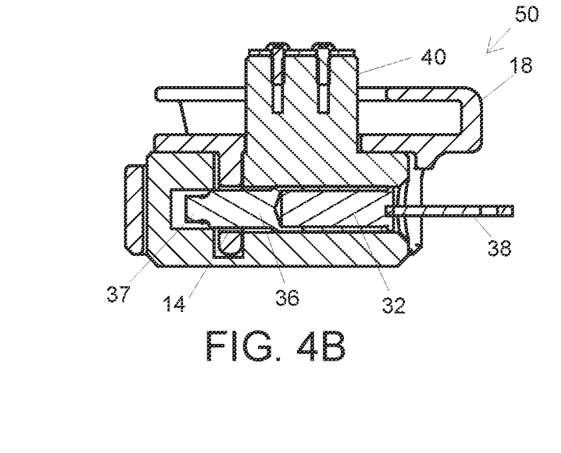
FIG. 4B illustrates a cross sectional view of the coupler lock assembly of FIG. 4A in the locked position taken across the line A-A shown in FIG. 4A.
Figure 4C:
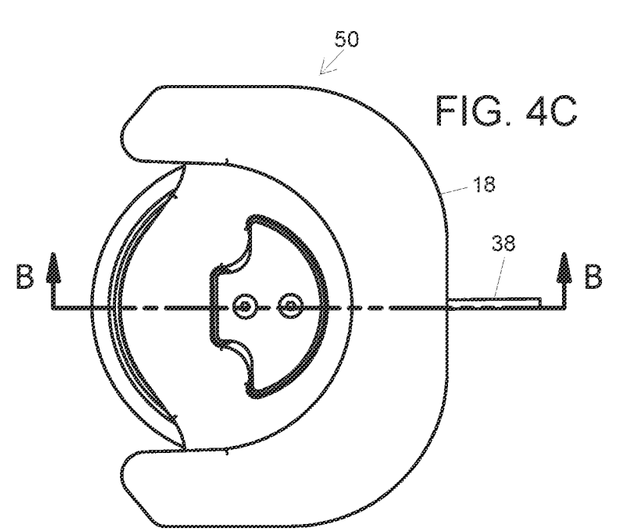
FIG. 4C illustrates a top plan view of the coupler lock assembly with the shackle and lock cylinder in a released position according to an exemplary embodiment.
Figure 4D:
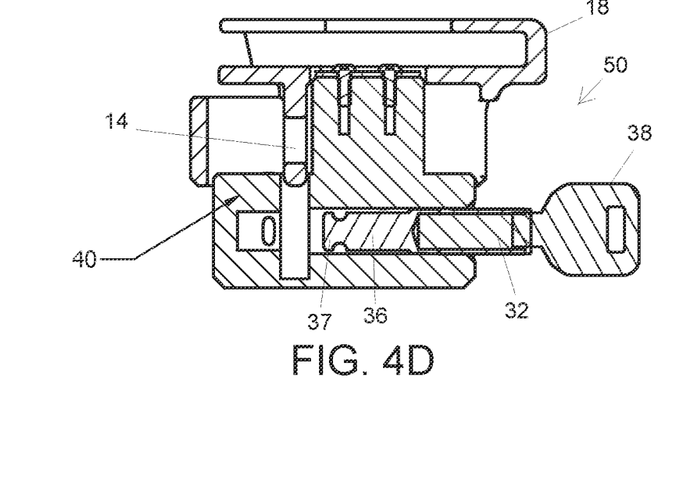
FIG. 4D illustrates a cross sectional view of the coupler lock assembly of FIG. 4C in the released position taken across the line A-A shown in FIG. 4C.
Figures 5A, 5B, 5C:
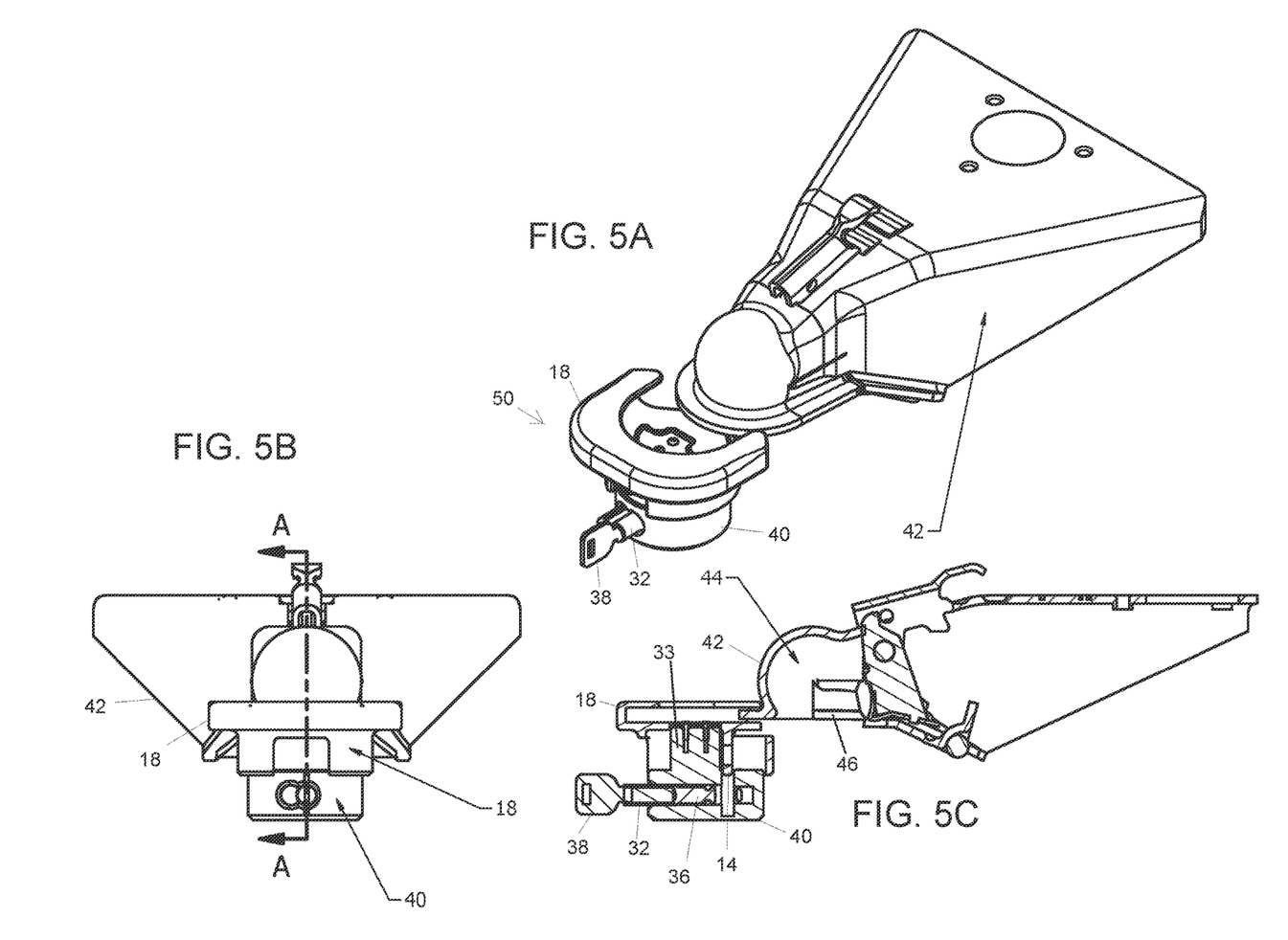
FIG. 5A illustrates a top and side perspective view of the coupler lock assembly of FIG. 4C in the released positioned prior to installation to a trailer coupler according to an exemplary embodiment.
FIG. 5B illustrates a front elevational view of the coupler lock assembly and trailer coupler of FIG. 5A prior to installation.
FIG. 5C illustrates a cross sectional view of the coupler lock assembly and trailer coupler of FIG. 5A prior to installation taken across the line A-A shown in FIG. 5B.
Figure 6A:
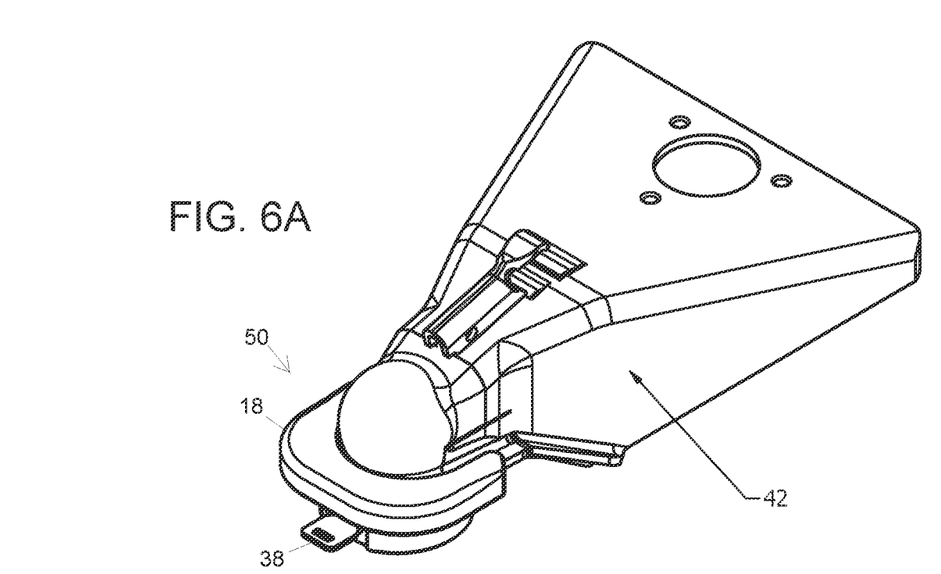
FIG. 6A illustrates a top and side perspective view of the coupler lock assembly of FIG. 4A in the locked positioned after installation to a trailer coupler according to an exemplary embodiment.
Figure 6B:
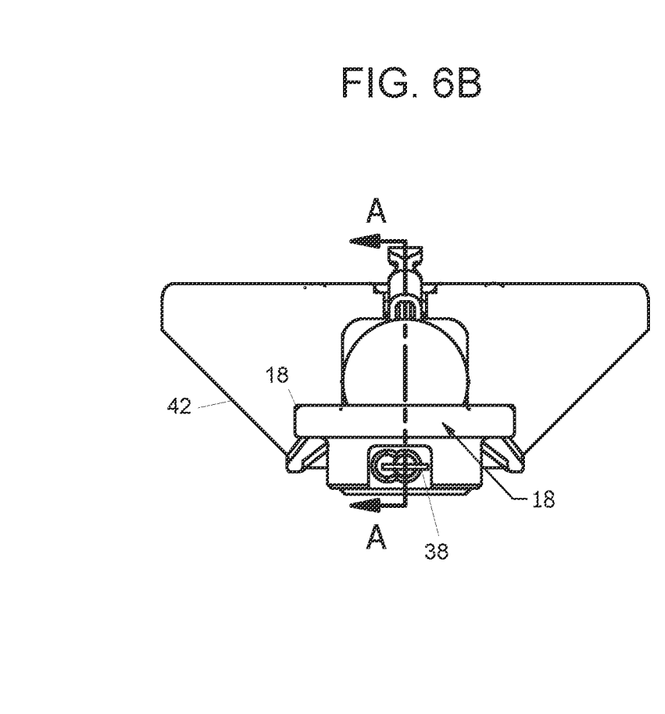
FIG. 6B illustrates a front elevational view of the coupler lock assembly and trailer coupler of FIG. 6A after installation.
Figure 6C:
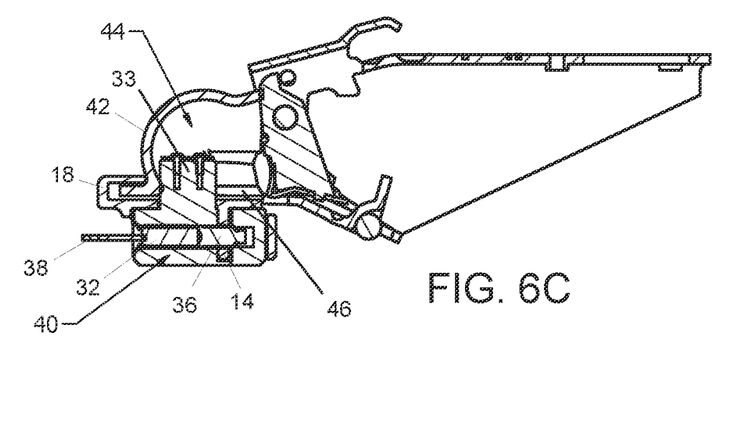
FIG. 6C illustrates a cross sectional view of the coupler lock assembly and trailer coupler of FIG. 6A after installation taken across the line A-A shown in FIG. 6B.

FIGS. 1 to 6 illustrates a plurality of components and views of a trailer coupler lock according to an exemplary embodiment. In particular, FIG. 1 illustrates a plurality of views including perspective views (FIGS. 1A, 1B), front-side view (FIG. 1C), top view (FIG. 1D), and cross sectional view (FIG. 1E) of a coupler lock body according to an exemplary embodiment. FIG. 2 illustrates views including perspective view (FIG. 2A), side view (FIG. 2B), top view (FIG. 2C), and cross sectional view (FIG. 2D) of a pin body according to an exemplary embodiment. FIG. 3 illustrates views including perspective view (FIG. 3A), rear view (FIG. 3B), side view (FIG. 3C), and cross sectional view (FIG. 3D) of a pin body assembly according to an exemplary embodiment. FIG. 4 illustrates views including top views (FIGS. 4A and 4C) and cross sectional views (FIGS. 4B and 4C) illustrating a complete coupler lock assembly formed by the coupler lock body, pin body and pin body assembly of FIGS. 1-3 with the shackle and lock cylinder in a lock position and a release position, respectively. FIG. 5 illustrates a plurality of views including top and side perspective view (FIG. 5A), front view (FIG. 5B), and cross sectional view (FIG. 5C) of the complete coupler lock assembly of FIG. 4 configured in the release position for installation to a trailer coupler. FIG. 6 illustrates a plurality of views including top and side perspective view (FIG. 6A), front view (FIG. 6B), and cross sectional view (FIG. 6C) of the complete coupler lock assembly of FIG. 4 configured in the lock position post after installation to the trailer coupler.

For convenience of description, the following reference numerals are utilized:

| ITEM # | DESCRIPTION |
| --- | --- |
| 10 | TRAILER COUPLER FLANGE RETAINER |
| 12 | PIN BODY GUARD |
| 14 | HASP |
| 16 | CATCH TAB |
| 18 | COUPLER LOCK BODY |
| 19 | TOP HOLE IN LOCK BODY |
| 20 | LOCK CYLINDER BORE |
| 22 | SHACKLE RETAINER ROLL PIN HOLES |
| 24 | HASP POCKET |
| 26 | RETAINER PLATE |
| 27 | PLATE SCREW HOLES |
| 28 | CATCH GROOVES (CHANNELS) |
| 29 | PLATE SCREWS |
| 30 | PIN BODY |
| 32 | LOCK CYLINDER |
| 33 | PROTRUDING PIN PORTION OF PIN BODY |
| 34 | SHACKLE RETAINER ROLL PINS |
| 36 | SHACKLE |
| 37 | SHACKLE HEAD |
| 38 | KEY |
| 40 | COMPLETE PIN BODY ASSEMBLY |
| 42 | TRAILER COUPLER |
| 44 | TRAILER COUPLER BALL SOCKET |
| 46 | UNDERJAW OF TRAILER COUPLER |
| 50 | COMPLETE COUPLER LOCK ASSEMBLY |

The trailer coupler lock features a large pin body 30 which houses a hidden shackle 36. The coupler lock body 18 has a hidden hasp 14 which accepts the shackle 36 when the pin body 30 is in lock position as shown in FIG. 4A, securing the coupler lock body 18 on the trailer coupler 42 as shown in FIG. 6. Once the lock assembly is in place, there is no open access to compromise the hidden hasp 14 and shackle 36. The design of the lock body 18 fits tight to the coupler 42 profile which minimizes openings for a pry bar to fit.

FIGS. 1A-E illustrate the coupler lock body 18, which is the foundation of the whole coupler lock assembly and houses the pin body assembly 40. FIGS. 2A-D illustrate the pin body 30 machined for all lock hardware. In some embodiments, the pin body 30 is fabricated as shown and ready to thereafter accept one or more different off-the-shelf lock cylinders 32, which are installed within the pin body 30. FIGS. 3A-D illustrate the pin body assembly 40 showing the pin body 30 with lock cylinder 32, shackle 36 and shackle retainer roll pins 34 installed. FIGS. 4A-D illustrate the complete coupler lock assembly 50 showing the coupler lock body 18 and pin body assembly 40 together in locked (FIG. 4A-B) and released (FIG. 4C-D) positions.

A method of installing and using the trailer coupler lock of FIGS. 1-4 is described in FIGS. 5-6. FIGS. 5A-C illustrate the complete coupler lock 50 pre-installation, where the lock assembly 50 in the released configuration is positioned in relation to the trailer coupler 42 before installing. FIGS. 6A-C illustrate the complete coupler lock assembly 50 installed in the lock position after installation. In the configuration of FIG. 6, the trailer coupler lock 50 is activated and acts as a security system preventing the trailer coupler 42 from being attached to a trailer hitch on a vehicle.

In this embodiment, the trailer coupler lock comprises two main components that are put together to form a coupler lock assembly 50:

1. Coupler Lock Body 18

The coupler lock body 18 made of metal is the main structure of the lock. It slides onto the trailer coupler 42 and retains the pin body assembly 40. The lock body 18 acts as a cage and features the hidden hasp 14 which accepts the pin body shackle 36. The pin body 18 houses the pin body 30 and lock cylinder 32 (i.e., the pin body assembly 40) when lock assembly 50 is complete.

2. Pin Body 30

The pin body 30 machined from metal fits into the coupler lock body 18. As shown in FIG. 2, it has a hasp pocket 24 and lock cylinder bore 20, into which the key cylinder 32 and shackle 36 are installed in order to form the pin body assembly 40. The upper protruding pin portion 33 of the pin body 30 is what fits into the coupler ball socket 44 when in lock position shown in FIG. 6.

In some embodiments, the protruding pin portion 33 has a non-circular cylindrical shape such as a half circle cross section that extends vertically upwards. Although a circular cross section (i.e., a perfect cylinder shape) may also be used in other embodiments, the half circle cross sectional shape of the protruding pin portion 33 in the embodiment of FIG. 2 helps maximize the amount of pin 33 material that enters into the trailer coupler ball socket 44 while still being able to pass by the underjaw 46 of the coupler 42 (see FIG. 6B). Beneficially, in some embodiments the protruding pin portion 33 being profiled or shaped in the manner as illustrated in FIG. 2, increases the strength of the protruding pin portion 33 because a circular cross section of the pin 33 would necessitate a small diameter circle in order to pass by the underjaw 46 of the coupler 42. The profiled/shaped pin 33 of this embodiment further decreases pry bar intrusion space making it that much more difficult for a thief to insert a pry bar past into the coupler socket 44 when the pin 33 is slid upwards into the socket 44.

The coupler lock body 18 retains the pin body assembly 40 and together are one working assembly. The coupler lock body 18 slides horizontally onto the trailer coupler as illustrated in FIG. 5. When the pin body 18 is in position, the pin body assembly 40 is slid upward such that the upper protruding pin portion 33 enters into the coupler ball socket 44 via top hole 19, which secures the coupler lock body 18 in the lock position of FIG. 6 such that the lock assembly 50 cannot be removed from the trailer coupler 42 without first lowering the pin body assembly 40. After the pin body 18 is in position, the key 38 slides the shackle 36 through the hasp 14, locking the assembly 50 together onto the trailer coupler 42 and preventing an unwanted union with a trailer hitch.

Figure 1A:
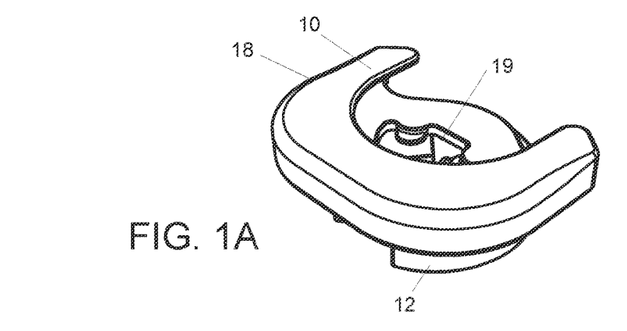
FIG. 1A illustrates a top and side perspective view of a coupler lock body according to an exemplary embodiment.
Figure 1B:
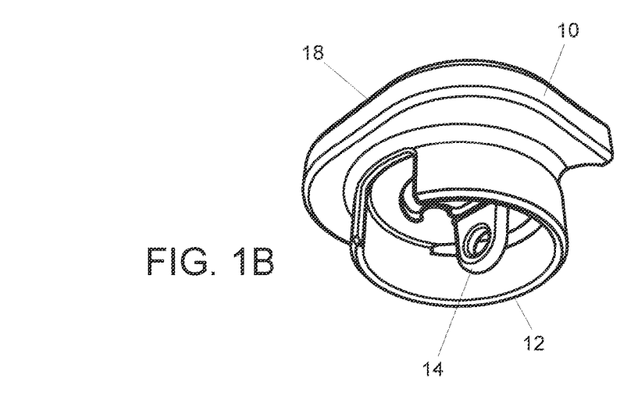
FIG. 1B illustrates a bottom and side perspective view of the coupler lock body of FIG. 1A.
Figure 1C:
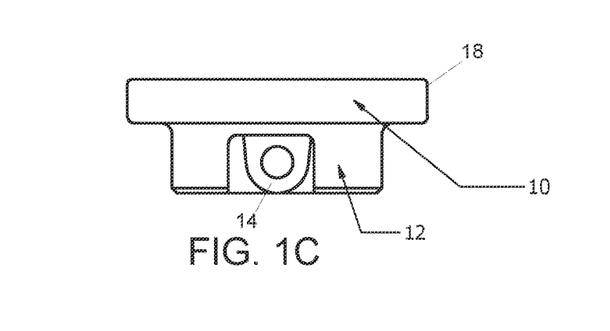
FIG. 1C illustrates a front elevational view of the coupler lock body of FIG. 1A.
Figure 1D:
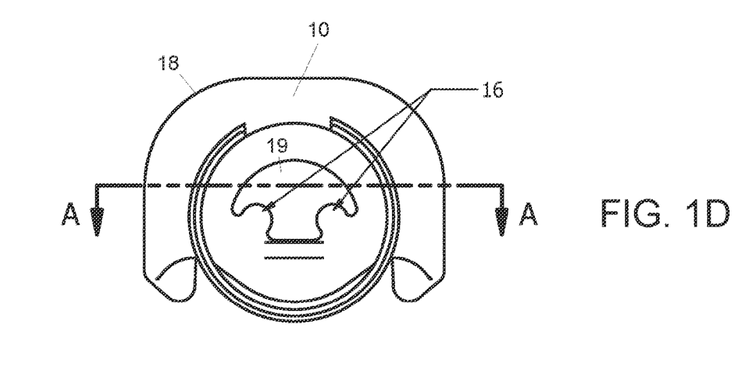
FIG. 1D illustrates a top plan view of the coupler lock body of FIG. 1A.
Figure 1E:
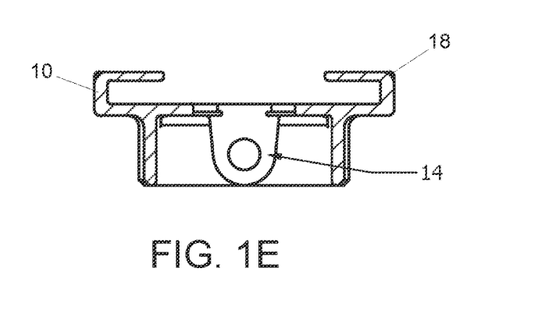
FIG. 1E illustrates a cross sectional view of the coupler lock body of FIG. 1A taken across the line A-A shown in FIG. 1D.
Figure 2A:
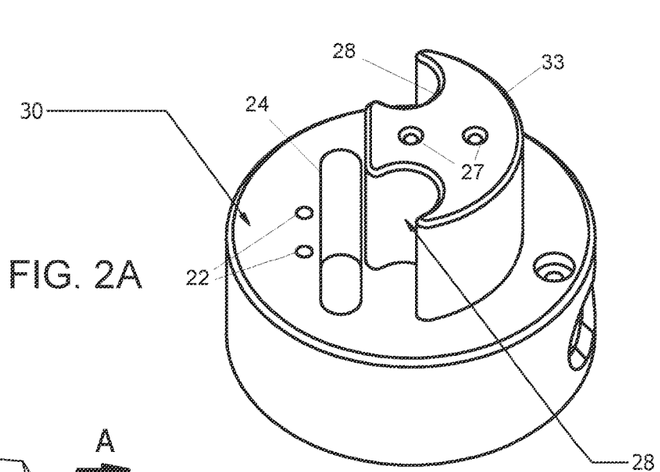
FIG. 2A illustrates a top and side perspective view of a pin body according to an exemplary embodiment.
Figure 2B:
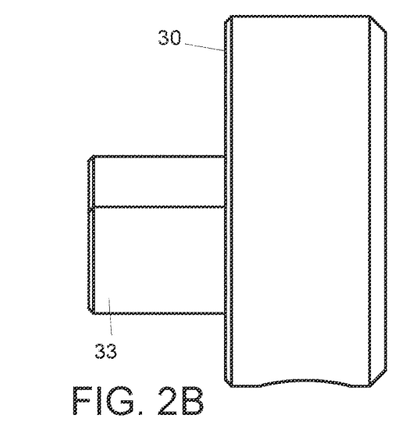
FIG. 2B illustrates a side elevational view of the pin body of FIG. 2A.
Figure 2C:
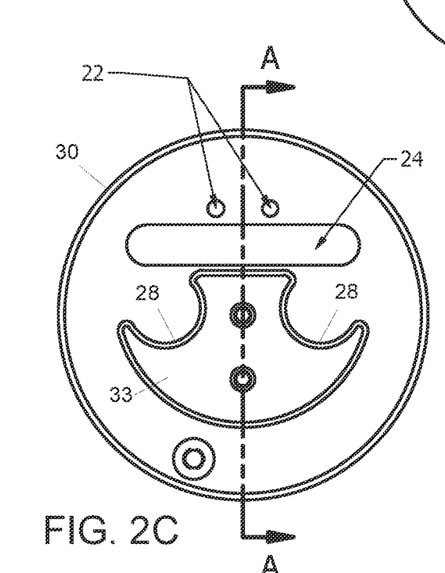
FIG. 2C illustrates a top plan view of the pin body of FIG. 2A.
Figure 2D:
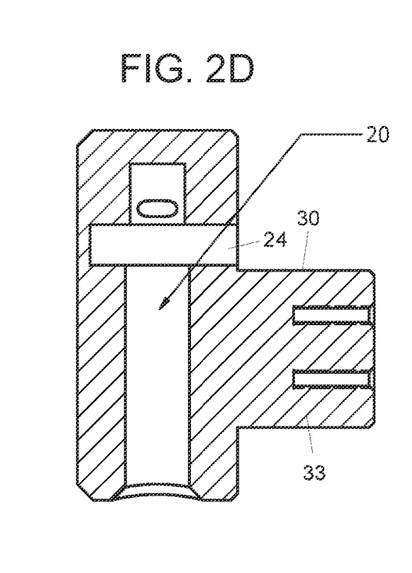
FIG. 2D illustrates a cross sectional view of the pin body of FIG. 2A taken across the line A-A shown in FIG. 2C.

As shown in FIG. 1D, in this embodiment, the lock body 18 further includes two catches 16. These catches 16 are tabs that slide along the corresponding catch grooves 28 being channels along the vertical sides of the protruding pin portion 33 of the pin body 30 (see FIGS. 2A and 2C). The interplay between the catches 16 and catch grooves 28 facilitates a smooth sliding action of the protruding pin portion 33 of the pin body assemble 40 between the lock and release positions in usage.

In some embodiments, the two parts of the lock assembly 50 being the lock body 18 and pin body assembly 40 are joined together such that even in the released position they still stay together. As shown in FIG. 3A, This is done in one embodiment by the installation of a retainer plate 26 on the top surface of the protruding pin portion 33. The retainer plate 26 covers the existing channels of the catch grooves 28 of the pin body 30 on the top surface and thus the catches 16 impact and are blocked by the retainer plate 26 after the pin body assembly 40 and the lock body have slid relative to one another a predetermined distance. In this way, the lock assembly 50 remains as a single unit as long as the retainer plate 26 is installed. The retainer plate 26 is secured by two plate screws 29 that are inserted into corresponding screw holes 27 on the pin body. (To fully separate the pin body assembly 40 from the lock body 18 such as for maintenance, the retainer plate 26 may be removed by first unscrewing and removing the plate screws 29, which are only accessible if the lock assembly 50 is not installed on a trailer coupler.)

The pin body 30 further includes shackle retaining roll pin holes 22, which accept shackle retaining roll pins 34 inserted therein. These roll pins 34 are separated by a predetermined distance from one another that works in conjunction with a size of the shackle head 37 to lock the shackle in place. As seen in FIGS. 4B and 4D, the shackle 36 has a head 37 that is profiled or shaped such that, depending on the rotation of the shackle 36, the shackle head 37 either engages with shackle retaining roll pins 34 in the locked position or disengages with the roll pins 34 in the released position. The shackle head 37 has a non-symmetrical shape (i.e., a rectangular shape in this embodiment) such that it is wider than the predetermined retaining roll pin 34 spacing when rotated into the locked position and narrower when rotated into the released position.

Figure 7A:
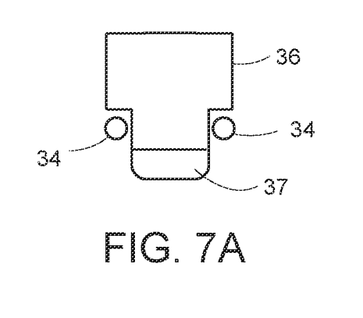
FIG. 7A illustrates a top down view of a profiled shackle head between rotated in a released position such that it is narrower than spaced retainer roll pins according to an exemplary embodiment.
Figure 7B:
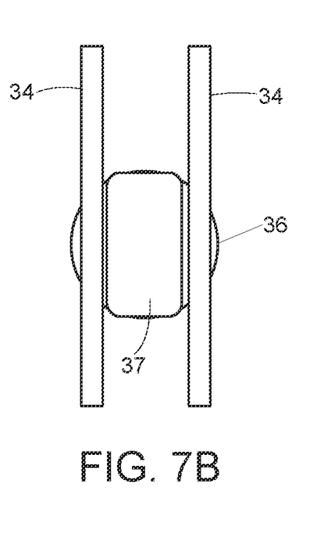
FIG. 7B illustrates front elevational view of the profiled shackle head of FIG. 7A fitting through the roll pins when rotated in the released position.
Figure 8A:
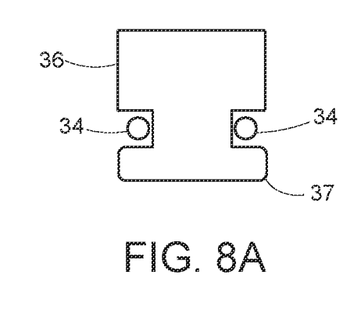
FIG. 8A illustrates a top down view of a profiled shackle head between rotated in a locked position such that it is wider than spaced retainer roll pins according to an exemplary embodiment.
Figure 8B:
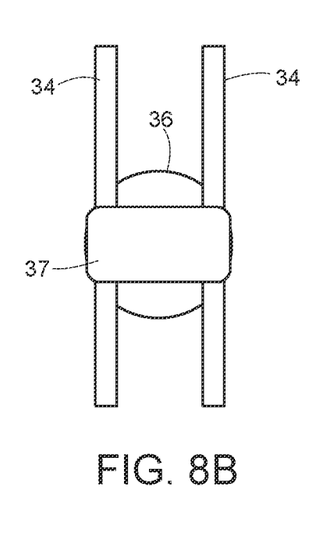
FIG. 8B illustrates front elevational view of the profiled shackle head of FIG. 8A not fitting through the roll pins when rotated in the locked position.

FIGS. 7A and 7B show the shackle head 37 rotated into the narrower orientation such that the head 37 can be inserted past the retaining roll pins 34—this position corresponds to when the key 38 has been used to rotate the shackle 36 into the unlocked position. FIGS. 8A and 8B show the shackle head 37 rotated into the wider orientation such that the head 37 cannot pass by the retaining roll pins 34, which corresponds to when the key 38 is used to rotate the shackle 36 into the locked position. The profiled shape of the shackle head 37 increases the strength and tamper resistance of the lock assembly 50 by ensuring the shackle 36 stays in place in the hasp 14 even if a thief attempts to extract the key lock cylinder 32 from the pin body 30 using pulling force.

An advantage of the lock design and method of installation of this embodiment is that the assembly 50 acts as a trailer antitheft lock and is easily installable any time a trailer is disconnected from the tow vehicle.

According to an exemplary embodiment, a trailer coupler lock 50 includes a coupler lock body 18 and pin body assembly 40. The coupler lock body 18 retains the pin body assembly 40 and slides horizontally onto a trailer coupler 42. When the lock body 18 is in position under the trailer coupler 42, the pin body assembly 40 is slid upward through the lock body 18 and a protruding pin section 33 of the pin body 30 passes via a top hole 19 in the pin body 18 to enter into the coupler ball socket 44. While the pin body 30 is in this position, a key 38 is utilized to slide a shackle 36 of the pin body assembly 40 through a hasp 14 on the lock body 18 thereby blocking retraction of the pin body 30 and locking the whole assembly 50 together onto the trailer coupler 42. In this locked position, the protruding pin section 33 of the pin body 30 secures the coupler lock body 18 to the trailer coupler 42 and prevents an unwanted union with a trailer hitch.

Although the invention has been described in connection with preferred embodiments, it should be understood that various modifications, additions and alterations may be made to the invention by one skilled in the art without departing from the spirit and scope of the invention. For example, the steps of the above-described and illustrated method of installing the trailer coupler are not restricted to the exact order shown, and, in other configurations, described/shown steps may be omitted or other intermediate steps added. In yet another example modification, one or more springs may be incorporated into the pin body assembly 40 to retract the shackle 36.

Functions of single units may be separated into multiple units, or the functions of multiple units may be combined into a single unit. All combinations and permutations of the above described features and embodiments may be utilized in conjunction with the invention.

What is claimed is:

1. A trailer coupler lock comprising:
   a lock body having a trailer coupler flange retainer around a top surface, a top hole through the top surface, and a pin body guard extending around a bottom surface;
   a hasp on the lock body that extends downward and is surrounded at least in part by the pin body guard;
   a pin body having a protruding pin portion extending upwards, a lock cylinder bore, and a hasp pocket;
   a key cylinder installed in the lock cylinder bore of the pin body; and
   a shackle attached to the key cylinder;
   wherein the shackle is moveable by the key cylinder within the pin body between a first position where the shackle passes into the hasp pocket and a second position where the shackle does not pass into the hasp pocket; and
   the hasp of the lock body enters the hasp pocket of the pin body when the lock body and the pin body are moved relative to one another by a user such that protruding pin portion of the pin body passes through the top hole of the lock body.

2. The trailer coupler lock of claim 1, further comprising:
   one or more catches being tabs extending from the lock body surface into the top hole;
   one or more catch grooves being channels running vertically on the protruding pin portion through which the catches slide while the protruding pin portion is moved through the top hole; and
   a retainer plate mounted on the top surface of the protruding pin portion;
   wherein the retainer plate covers the catch grooves thereby blocking the catches from passing by the retainer plate.

3. The trailer coupler lock of claim 1, further comprising:
   a plurality of shackle retaining roll pins;
   wherein the shackle retaining roll pins are installed on opposite sides of the lock cylinder bore and are separated from one another by a predetermined distance therebetween;
   the shackle is rotatable; and
   a head of the shackle has a non-symmetrical shape such that such the head is wider than the predetermined distance preventing the head from passing through the shackle retaining roll pins when the shackle is rotated into a locked position, and narrower than the predetermined distance thereby allowing the head to pass through the shackle retaining roll pins when the shackle is rotated into a released position.

4. The trailer coupler lock of claim 3, wherein the plurality of shackle retaining roll pins comprises a first roll pin installed in a first roll pin hole of the pin body and a second roll pin installed in a second roll pin hole of the pin body.

5. The trailer coupler lock of claim 3, wherein the non-symmetrical shape of the head of the shackle is a rectangular shape that has a first dimension wider than the predetermined distance and a second dimension narrower than the predetermined distance.

6. The trailer coupler lock of claim 3, wherein the shackle retaining roll pins are positioned along the lock cylinder bore at a position such that the head of the shackle passes by the shackle retaining roll pins when the shackle is moved by the key cylinder within the pin body into the first position.

7. The trailer coupler lock of claim 1, further comprising:
   one or more catches being tabs extending from the lock body surface into the top hole; and
   one or more catch grooves being channels running vertically on the protruding pin portion through which the catches slide while the protruding pin portion is moved through the top hole.

8. The trailer coupler lock of claim 1, wherein the protruding pin has a non-circular cross-sectional shape that extends upwards thereby increasing an amount of material that enters into a trailer coupler ball socket during usage while still being able to pass by an underjaw of the trailer coupler.

9. The trailer coupler lock of claim 8, wherein the non-circular cross-sectional shape is a half circle cross section.

10. The trailer coupler lock of claim 8, wherein the top hole of the lock body has a profiled hole that corresponds at least in part to the non-circular cross-sectional shape of the protruding pin thereby creating a fitting mechanism between the lock body and the pin body that cannot be rotated when the protruding passes through the top hole of the lock body.

11. The trailer coupler lock of claim 1, further comprising one or more springs incorporated into the pin body assembly to retract the shackle into the second position when the trailer coupler lock is in an unlocked configuration.

12. The trailer coupler lock of claim 1, wherein:
   the key cylinder is an off-the-shelf key cylinder; and
   the pin body is fabricated ready to thereafter accept the off-the-shelf key cylinder, which is installed within the lock cylinder bore of the pin body.

13. The trailer coupler lock of claim 1, wherein both the lock body and the pin body are made of metal.

14. The trailer coupler lock of claim 1, wherein, in an unlocked configuration, the lock body and the pin body are moveable apart from one another while remaining attached to one another such that the protruding pin portion of the pin body does not pass through the top hole of the lock body.

15. A method of utilizing the trailer coupler lock of claim 1, the method comprising:
configuring the trailer coupler lock into an unlocked position by first utilizing a key in the key cylinder to move the shackle into the second position such that the shackle is not in the hasp pocket, and then moving the lock body and the pin body apart from one another such that the protruding pin portion of the pin body is not passing through the top hole of the lock body and the hasp of the lock body does not enter the hasp pocket;
sliding the trailer coupler flange retainer of the lock body onto a flange of a trailer coupler to be secured while the trailer coupler lock is configured in the unlocked position; and
configuring the trailer coupler lock into a locked position after sliding onto the trailer coupler by first moving the lock body and the pin body together such that the protruding pin portion of the pin body passes through the top hole of the lock body into a ball socket of the trailer coupler and the hasp enters the hasp pocket, and then utilizing the key in the key cylinder to move the shackle into the first position such that the shackle passes into the hasp pocket and through the hasp of the lock body thereby holding the lock body and the pin body together;
whereby the trailer coupler lock in the locked position on the trailer coupler prevents unauthorized coupling of the trailer coupler to a trailer hitch of a vehicle.

16. The method of claim 15, wherein there is no open access to the hasp and shackle after the trailer coupler lock is configured in the locked position on the trailer coupler.

17. The method of claim 15, further comprising removing the trailer coupler lock in the locked configuration from the trailer coupler by:
configuring the trailer coupler lock back into the unlocked position by first utilizing the key in the key cylinder to move the shackle into the second position such that the shackle is not in the hasp pocket, and then moving the lock body and the pin body apart from one another such that the protruding pin portion of the pin body is not passing through the top hole of the lock body and the hasp of the lock body does not enter the hasp pocket; and
sliding the trailer coupler flange retainer of the lock body off the flange of the trailer coupler.

18. The method of claim 15, wherein the trailer coupler is a ball type trailer coupler.

19. A trailer coupler lock assembly for use with a key cylinder having a shackle attached thereto, the trailer coupler lock assembly comprising:
a lock body having a trailer coupler flange retainer around a top surface, a top hole through the top surface, and a pin body guard extending around a bottom surface;
a hasp on the lock body that extends downward and is surrounded at least in part by the pin body guard; and
a pin body having a protruding pin portion extending upwards, a lock cylinder bore, and a hasp pocket;
wherein the lock cylinder bore of the pin body is fabricated ready to install the key cylinder;
after installation of the key cylinder in the lock cylinder bore, the shackle is moveable by the key cylinder within the pin body between a first position where the shackle passes into the hasp pocket and a second position where the shackle does not pass into the hasp pocket; and
the hasp of the lock body enters the hasp pocket of the pin body when the lock body and the pin body are moved relative to one another by a user such that protruding pin portion of the pin body passes through the top hole of the lock body.

20. The trailer coupler lock of claim 19, further comprising:
one or more catches being tabs extending from the lock body surface into the top hole; and
one or more catch grooves being channels running vertically on the protruding pin portion through which the catches slide while the protruding pin portion is moved through the top hole.

\* \* \* \* \*